United States Patent [19]

Janz et al.

[11] 4,226,464
[45] Oct. 7, 1980

[54] ARM REST SHAPED TO INCLUDE A THROUGH GRIP OR HAND GRIP WITH HOLLOW MOLDED BODY

[75] Inventors: Joachim Janz, Wuppertal; Bodo Mentzel, Velbert, both of Fed. Rep. of Germany

[73] Assignee: Gebr. Happich GmbH, Neuentreich, Fed. Rep. of Germany

[21] Appl. No.: 839,648

[22] Filed: Oct. 5, 1977

[30] Foreign Application Priority Data

Oct. 8, 1976 [DE] Fed. Rep. of Germany ....... 2645463

[51] Int. Cl.² .............................................. B60J 9/00
[52] U.S. Cl. ....................................... 296/153; 4/254; 5/52; 248/118; 297/411
[58] Field of Search ....................... 296/153; 297/411; 248/118; 5/52; 4/254

[56] References Cited

U.S. PATENT DOCUMENTS

| 2,677,415 | 5/1954 | Brink | 296/153 |
| 2,774,975 | 12/1956 | Frank | 297/411 |
| 3,487,134 | 12/1969 | Burr | 296/153 |

FOREIGN PATENT DOCUMENTS

| 509855 | 2/1955 | Canada | 296/153 |
| 211698 | 10/1960 | Fed. Rep. of Germany . | |
| 955322 | 4/1964 | United Kingdom | 297/411 |

Primary Examiner—Richard A. Bertsch
Attorney, Agent, or Firm—Ostrolenk, Faber, Gerb & Soffen

[57] ABSTRACT

An arm rest for a vehicle: a hollow molded body with a padded outer layer; the hollow body is held together at a film hinge or at a clip connection.

The invention relates to an arm rest with an included hand grip or with a separate hand grip attached to it for use in a motor vehicle, or the like and which arm rest comprises a supporting reinforcement insert that is provided with a padded outer layer.

5 Claims, 6 Drawing Figures

ARM REST SHAPED TO INCLUDE A THROUGH GRIP OR HAND GRIP WITH HOLLOW MOLDED BODY

BACKGROUND OF THE INVENTION

It is easy to manufacture arm rests with through hand grips. This eliminates any need for cavities being formed in the arm rest and uses complete planar formations at the back of the grip. This construction saves expensive insert material which is required when the arm rest is formed with cavities. Sometimes for enabling gripping of the arm rest and also for aesthetic reasons, it is necessary to cover the exterior of the arm rest with a foamed plastic or other padding layer. Such a layer does not adversely affect the strength of the arm rest, as this is achieved by the reinforcement insert. Padding is not needed for safety on the planes or surfaces facing away from the interior of the vehicle.

SUMMARY OF THE INVENTION

It is the object of the invention to provide an arm rest with a through grip or with a separate attached hand grip. Due to reduction of the material used, such an arm rest can be made substantially cheaper.

According to the invention, the reinforcement insert inside the arm rest is a continuous hollow body extending from one attachment surface at one end to the other attachment surface at the other end. The hollow body has a continuous open channel or space extending completely through it. One resulting advantage is the saving of the material used to make the insert. Also, internal spaces are created which are otherwise not obtainable. Further, the slides of the fabrication mold can be more economically made. This even permits use of a simple two-part mold which is not expensive to make and results in substantially shorter cycle times, because no time is needed for reciprocating movement of the slide of the simple mold.

The hollow body of the insert may be formed using different production methods. Whenever a complicated body form is made, it should be made by blow molding. Although blow molded bodies cannot be made with very hard materials, blow molded arm rests or hand grips in vehicles can satisfy static stress requirements.

If, on the other hand, an especially hard material must be used for the hollow reinforcing insert body, it is desirable to make the body by injection molding. It is then necessary, however, to subsequently close off certain areas which form the slide inlet for the fabricating process. Such closing off is done by a cover introduced into this slide inlet opening. There are different designs for retention of the covers. In one case, the cover which closes the opening may be made of uniform material and in one piece and it is attached to the walls of the hollow insert body via a film hinge. Alternatively, the cover may be made separately and then be connected with the walls of the hollow body by an attachment clip.

Another possibility is for the arm rest to have no through grip, and instead to be in one piece, with a separate attached grip formation. Because such an arm rest can have all of its surfaces be planar, it may be hollow and be of box design. To form the hollow box type arm rest, a slide is not necessary in the fabrication mold. Instead, the cover or bottom portion of the mold may have this box type design. The use of the slide is then limited to molding of the grip portion.

BRIEF DESCRIPTION OF THE DRAWINGS

Other objects and features of the invention are illustrated in several embodiments shown in the drawings, in which.

DESCRIPTION OF PREFERRED EMBODIMENTS

All embodiments include a hollow body. $1a$ having extended portions which effect attachment planes $P_1$ and $P_2$ at their extremities. The hollow body is the supporting element and has the basic form of an arm rest or of a hand grip, i.e., a through grip molded with an open section between the extending portions which open section is subsequently covered. Thereafter the body is surrounded by and fitted securely into a foam plastic padded outer layer 2 so the arm rest or grip attains the final form of grip or arm rest 1. The foam covering layer 2 may be applied without a separate skin or it may be provided with an outer skin which forms an integral part thereof. The skin may be prefabricated, for example, in a rotation or blowing process. Alternatively, the skin may be applied after completion of the foamed layer, like a lacquer layer.

Figure 1:
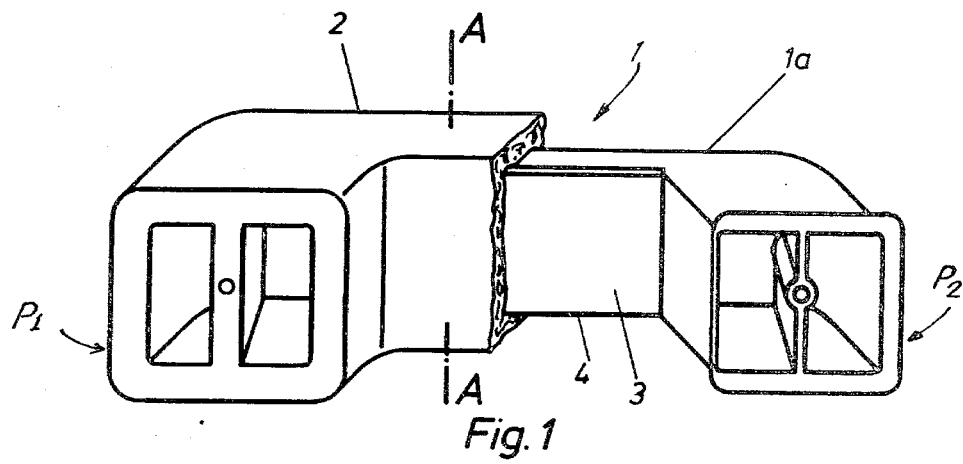
FIG. 1 is a perspective view of one embodiment of an arm rest with a through grip which has been made by injection molding, and including a cover connected by a film hinge with the molded part of the arm rest.
Figures 2, 4:
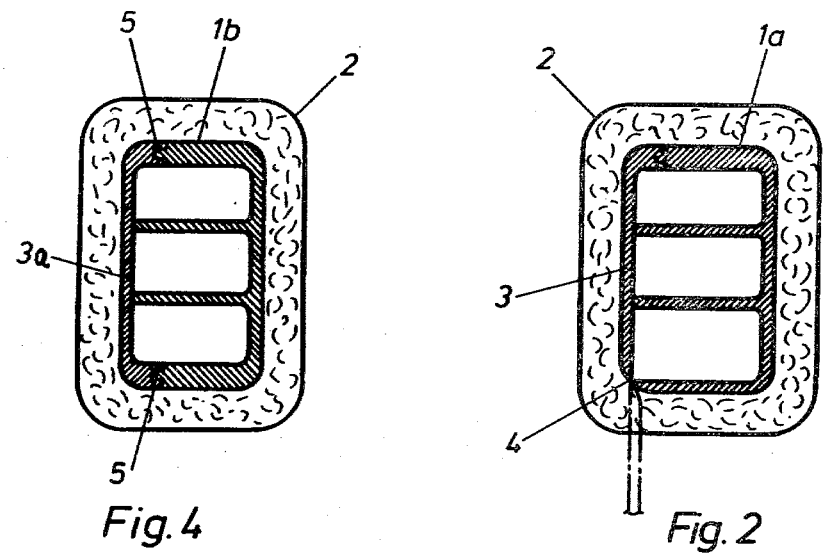
FIG. 2 is a cross sectional view of the first embodiment along line A—A of FIG. 1.
FIG. 4 is a cross sectional view of the second embodiment along line B—B of FIG. 3.

In the first embodiment of FIGS. 1 and 2, the hollow body $1a$ has been injection molded. All hollow regions, including the region behind the longitudinal wall of the through grip, can be simply formed in a two part fabrication mold, without a slide being required for the mold. The final exterior shape of the hollow body is completed by its cover 3, which is folded to close the open section subsequent to molding at a film hinge 4 on one edge as shown. The padded layer 2 surrounds the molded part of the hollow body $1a$, and extends completely around it, continuously from one end or attachment plane through the curved shaping of the arm rest to the opposite end or attachment plane. As a result, there is no access to the foamed material, even if it is still under pressure.

Figure 3:
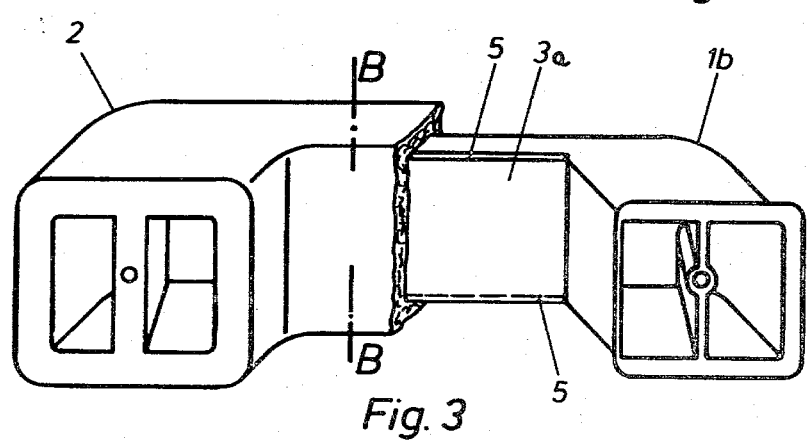
FIG. 3 is a perspective view of a second embodiment of arm rest, which is like that in FIG. 1, but having a loose cover held to the reinforcing insert by a clip connection.

The second embodiment of FIGS. 3 and 4 differs from the first embodiment only in that the closing cover $3a$ is connected through a clip connection 5 with the other walls of the hollow body $1b$ as a loose, separately made cover.

Figure 5:
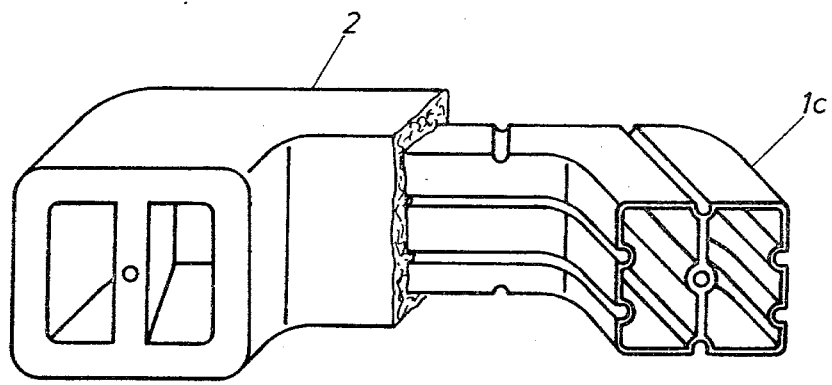
FIG. 5 is a perspective view of a third embodiment, comprising a hand grip with a blow molded, hollow body.
Figure 6:
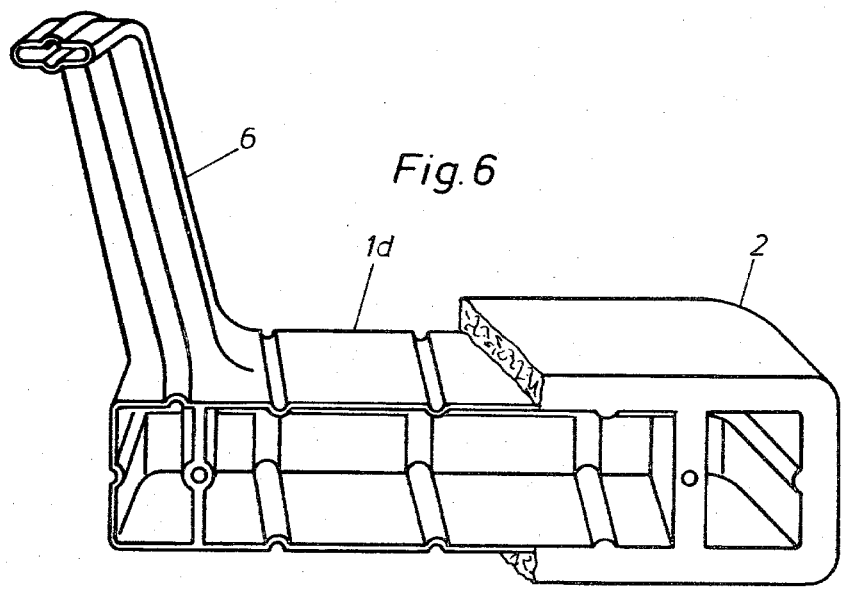
FIG. 6 is a perspective view of a fourth embodiment of arm rest without a through grip and with a hand grip molded on in one piece and the arm rest comprising a blow molded hollow body.

FIGS. 5 and 6 show blow molded hollow bodies $1c$ and $1d$, respectively. The form or shape of the hollow body $1c$ in FIG. 5 corresponds essentially to the basic form of the hollow bodies $1a$ and $1b$.

In FIG. 6 the hollow body 1d does not have a grip through section in the arm rest. It may, therfore, be simply shaped as a box, with a completely open side. The separate, but integrally attached hand grip 6 is designed, as with the other embodiments, as a hollow body with closed walls all around and extending from one attachment plane at one end to an attachment plane at the other end. A hand grip 6 is provided, with one of its ends being attached to one end of the body 3. The hand grip 6 has its one end in an attachment plane that is in the plane of the open side of the arm rest.

Although the invention has been described with reference to several embodiments, many variations and modifications will now be apparent to those skilled in the art. Therefore, this invention is to be limited, not by the specific disclosure herein, but only by the appended claims.

We claim:

1. A through grip arm rest for a vehicle, or the like, comprising:

a supporting reinforcement insert having extending portions effecting attachment planes;

said insert being a hollow body which is hollow from one said attachment plane of said arm rest to the other attachment plane thereof and being molded with an open section intermediate said extending portions and a cover closing said open section to complete said insert, including a padded outer layer around said insert.

2. The arm rest of claim 1, wherein said hollow body is a blow molded body.

3. The arm rest of claim 1, wherein said cover is uniform in material and is comprised of one piece; said one piece cover being joined at a film hinge with said hollow body and said cover being thus foldable to close said open section.

4. The arm rest of claim 1 wherein said hollow body is injection molded.

5. The arm rest of claim 1, wherein said cover has edges with clip means for attachment to coacting clip means of edges of said open section.